United States Patent
Madhav et al.

(10) Patent No.: US 7,139,926 B1
(45) Date of Patent: Nov. 21, 2006

(54) STATEFUL FAILOVER PROTECTION AMONG ROUTERS THAT PROVIDE LOAD SHARING USING NETWORK ADDRESS TRANSLATION (LSNAT)

(75) Inventors: Praveen Madhav, Mountain View, CA (US); Rama Ramakrishnan, Santa Clara, CA (US); Kumar Mehta, Cupertino, CA (US); Apurva Mehta, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 495 days.

(21) Appl. No.: 10/233,002

(22) Filed: Aug. 30, 2002

(51) Int. Cl.
*G06F 11/00* (2006.01)
(52) U.S. Cl. .......................... 714/4; 718/105
(58) Field of Classification Search .............. 714/4, 714/10, 11–13, 43; 718/105; 709/238, 239, 709/242; 370/285, 401, 402
See application file for complete search history.

(56) References Cited

U.S. PATENT DOCUMENTS

| | | | |
|---|---|---|---|
| 6,049,524 A * | 4/2000 | Fukushima et al. ......... 370/220 |
| 6,058,431 A | 5/2000 | Srisuresh et al. | |
| 6,397,260 B1 * | 5/2002 | Wils et al. ................... 709/238 |
| 6,487,605 B1 * | 11/2002 | Leung ......................... 709/245 |
| 6,578,066 B1 * | 6/2003 | Logan et al. ................ 718/105 |
| 6,760,775 B1 * | 7/2004 | Anerousis et al. .......... 709/238 |
| 2003/0067924 A1 * | 4/2003 | Choe et al. .................. 370/400 |

OTHER PUBLICATIONS

Cisco Systems, Failover Configuration for LocalDirector, 2000, 23 pages, San Jose.
P. Srisuresh and D. Gan, Load Sharing Using IP Network Address Translation (LSNAT), Aug. 1998, 18 pages, IETF RFC: 2391.

* cited by examiner

*Primary Examiner*—Dieu-Minh Le (57) ABSTRACT

Failure protection is provided between two routers that are actively implementing load sharing using network address translation. Failure protection is achieved by generating state information at the two routers and then exchanging the state information between the two routers so that each router has a combined set of state information that can be used in the event of a failure of the other router.

21 Claims, 11 Drawing Sheets

Session Bindings

| Session ID | Client | | Router | | Server | |
|---|---|---|---|---|---|---|
| | IP Address | Port Number | VIP Address | Port Number | Real IP Address | Port Number |
| A | $IP_1$ | 80 | $IP_3$ | 80 | $IP_4$ | 80 |
| B | $IP_2$ | 80 | $IP_3$ | 80 | $IP_6$ | 80 |

Before Exchange

FIG. 10

After Exchange

STATEFUL FAILOVER PROTECTION AMONG ROUTERS THAT PROVIDE LOAD SHARING USING NETWORK ADDRESS TRANSLATION (LSNAT)

FIELD OF THE INVENTION

The invention relates to stateful failover protection, and more particularly to stateful failover protection between two routers that provide load sharing among multiple network nodes using network address translation.

BACKGROUND OF THE INVENTION

Figure 1:
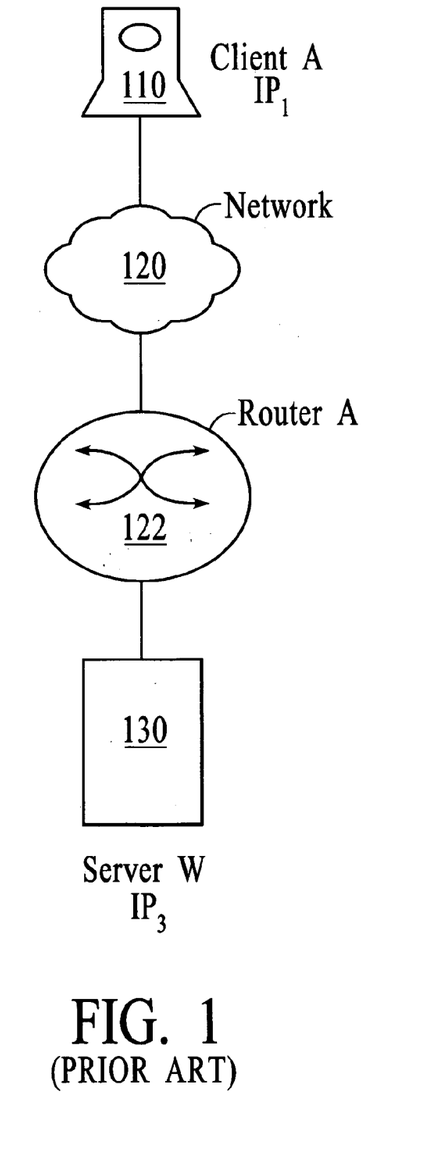
FIG. 1 depicts an example of a client (client A) at IP address 1 ($IP_1$) and a server (server W) at IP address 3 ($IP_3$) that communicate between each other using IP as is known in the prior art.

The Internet protocol (IP) enables the transmission of data between two network nodes by assigning IP addresses to each network node and then routing the data in IP datagrams, or "packets," from the source IP address to the destination IP address. FIG. 1 depicts an example of a client 110 (client A) at IP address 1 ($IP_1$) and a server 130 (server W) at IP address 3 ($IP_3$) that communicate between each other using IP. In the example of FIG. 1, the client and server connect through an intermediate network 120 (i.e., an unspecified network, often referred to as a "network cloud") and a router 122. As is known in IP, a portion of the IP address space is reserved for globally unique IP addresses. That is, IP addresses that are globally significant. The IP addresses that are not globally unique are only unique to the local network in which they are employed. In the example of FIG. 1, the client and server are identified by globally unique IP addresses. Throughout the description, similar reference numbers may be used to identify similar elements.

Figure 2:
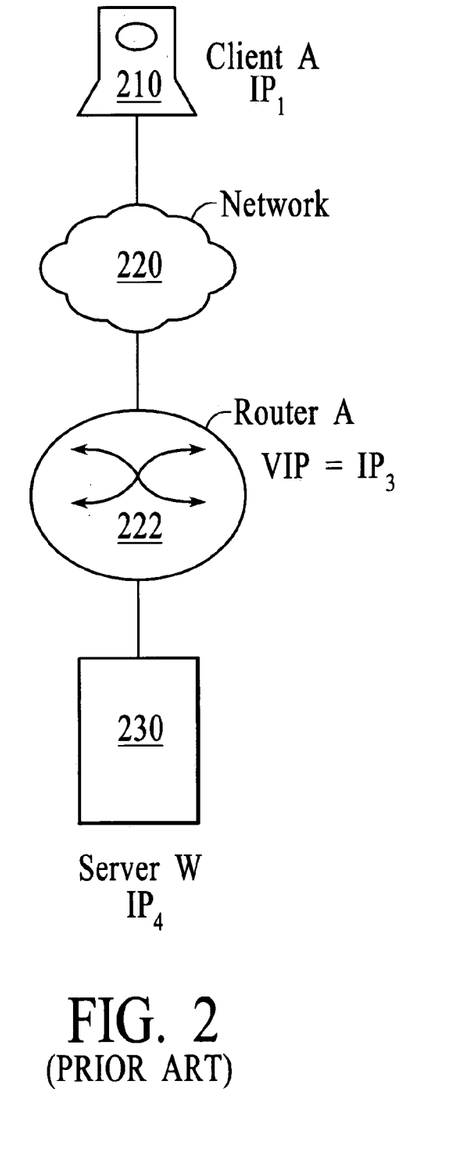
FIG. 2 depicts an example of a network in which NAT is used to connect client A to server W as is known in the prior art.

The number of globally unique IP addresses is a limited resource and the exponential growth of the Internet is continually shrinking the lot of available globally unique IP addresses. Because the lot of available globally unique IP addresses is a limited resource, there is a need to conserve the allocation of globally unique IP addresses. One technique, referred to as network address translation (NAT), that is used to preserve the limited number of globally unique IP addresses, involves establishing a single globally unique IP address as a virtual IP (VIP) address and then mapping the VIP address to multiple private (local) IP address within a private network domain. FIG. 2 depicts an example of a network in which NAT is used to connect client A to server W. As depicted in FIG. 2, the router 222 assumes the VIP address of $IP_3$, which is the IP address that is the derived destination IP address of the client's communications. When the router receives IP datagrams destined for the VIP address, the router translates the VIP address to the real IP address of server W 230. For example, the router translates the VIP address, $IP_3$, to the real $IP_4$, of the server. Using NAT, the VIP address is the only globally unique IP address that is needed to enable various clients to reach network devices that are located beyond the router. Any other IP addresses beyond the VIP can be locally unique IP addresses that are reach utilizing NAT.

One common application of NAT involves connecting multiple servers, for example servers in a server farm, to the Internet. The multiple servers are connected through a single VIP address, thereby avoiding the need to allocate a globally unique IP address to each server in the server farm. The application of NAT can be further enhanced by intelligently establishing the sessions between the clients and servers such that the load on the servers is distributed in a desired manner. For example, the load of sessions can be distributed equally among the servers. One technique for load distribution, known as "Load Sharing using IP Network Address Translation (LSNAT)," is described in the IETC document RFC 2391 (August 1998), which is incorporated by reference herein. NAT may also include network address port translation (NAPT) as described in RFC 2391.

Figure 3:
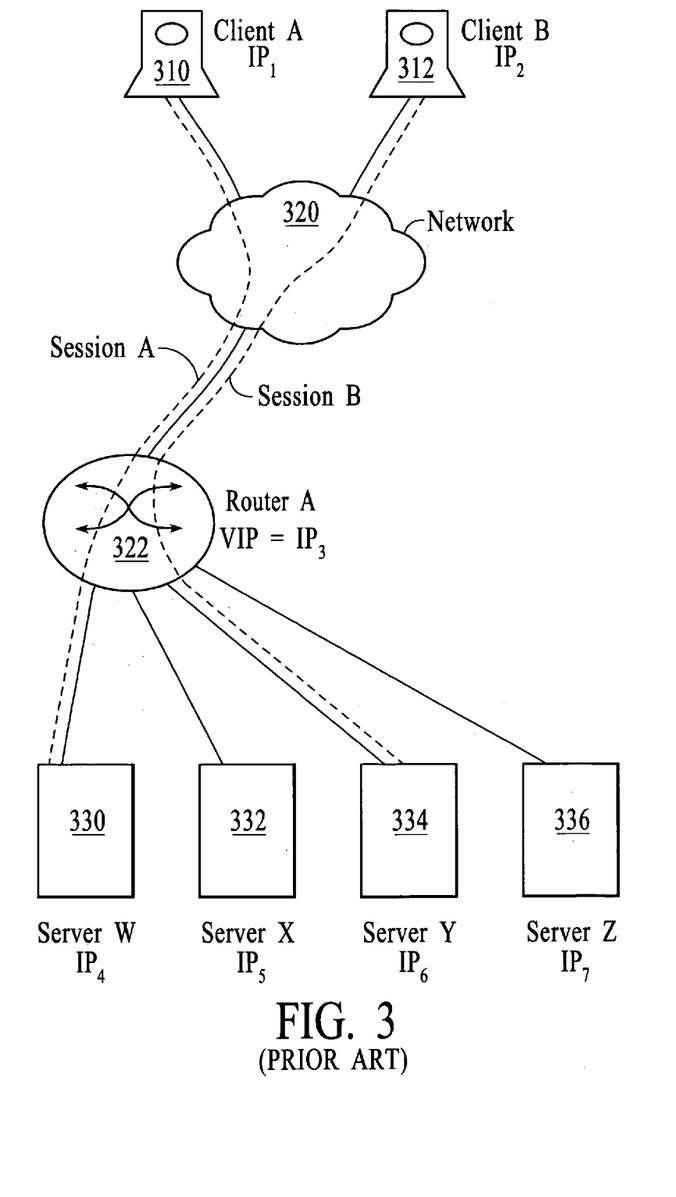
FIG. 3 depicts an example network in which LSNAT is implemented between clients A and B and servers W, X, Y, and Z as is known in the prior art.

FIG. 3 depicts an example network in which LSNAT is implemented. The network includes two clients 310 and 312 (clients A and B) that are connected to servers W, X, Y, and Z 330, 332, 334, and 336 via an intermediate network 320 and a router 322. In the example of FIG. 3, the router assumes the VIP address, $IP_3$, and manages the load distribution and translation functions between the clients and servers. Specifically, the router establishes connections, referred to herein as "sessions," for communications between the clients and the servers in a manner that achieves a desired load distribution among the servers. In an embodiment, the sessions are established according to the transmission control protocol (TCP) or the user datagram protocol (UDP) protocols which reside at layer 4 of the open system interconnection (OSI) model as defined by the International Standards Organized (ISO). In an embodiment, each session is defined by a session binding, with each session binding identifying the client IP address, the client port number, the VIP address, the virtual port number, the real IP address, and the real port number. The session bindings are maintained by the router as part of the router's state information. In the example of FIG. 3 a session (session A) exists between client A and server W and a session (session B) exists between client B and server Y.

Figure 4:
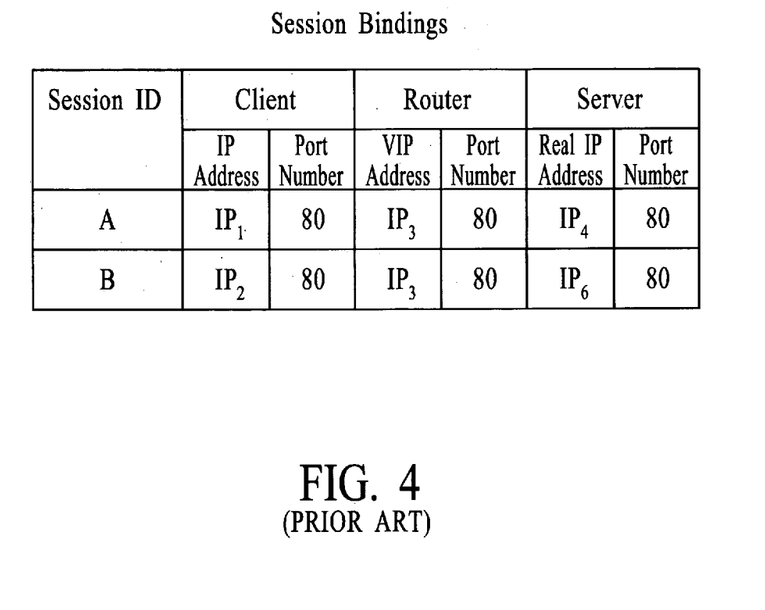
FIG. 4 depicts an example of session bindings for sessions A and B as is known in the prior art.

FIG. 4 depicts an example of the session bindings for sessions A and B as depicted in FIG. 3. With regard to session A, the session binding includes a client IP address $IP_1$, a VIP address $IP_3$, and a real IP address $IP_4$. For example purposes the port numbers are all port 80. In a router, session bindings can be maintained for a period of time that depends on factors such as the available memory in the router, the volume of sessions processed by the router and/or QoS characteristics desired by the server operation. Maintenance of session bindings is desirable because the maintained sessions enable clients to return to same servers during each contact with the server farm. Returning to the same server can provide continuity to the client by, for example, enabling the client to access the same shopping cart during each contact with the server farm.

Figure 5:
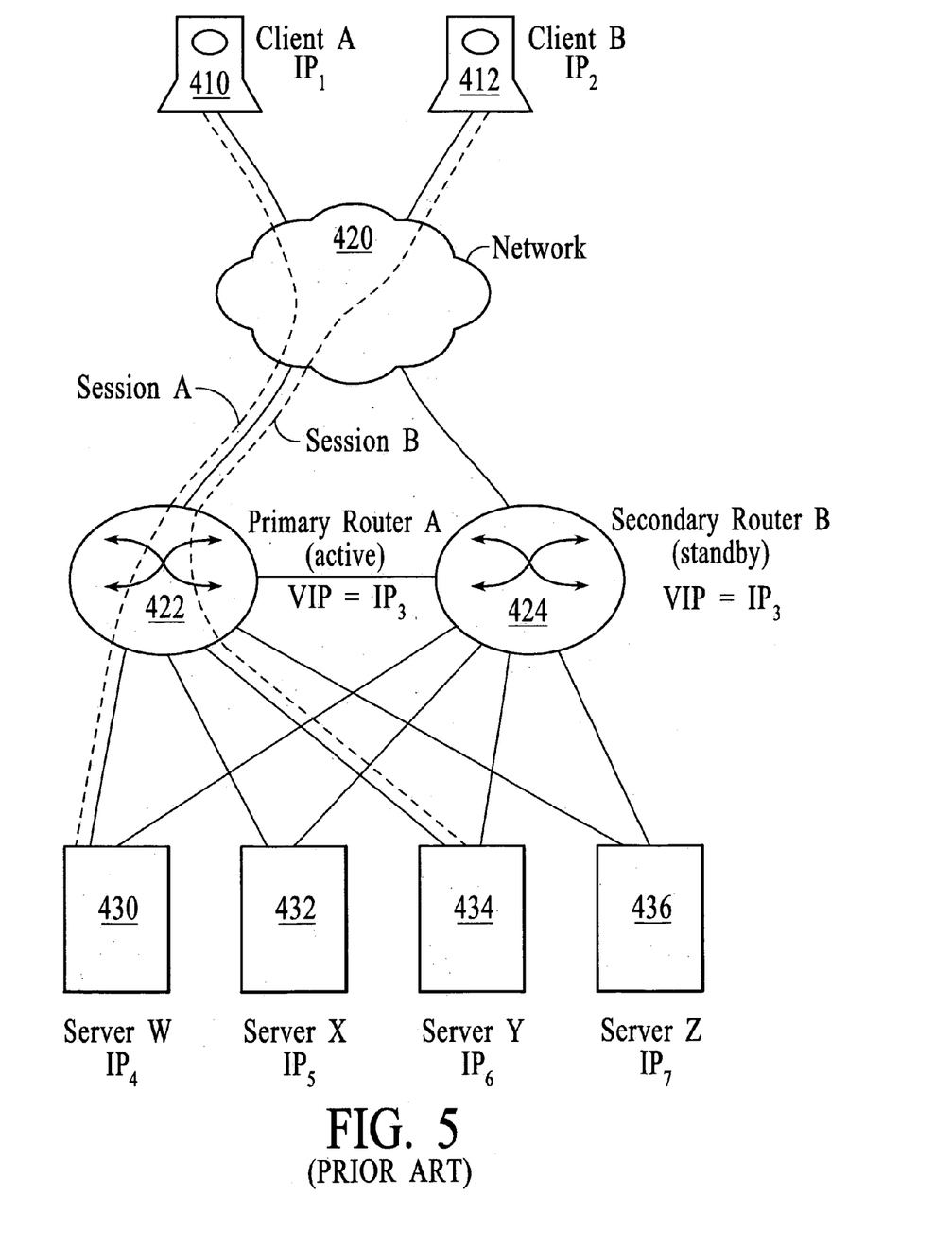
FIG. 5 depicts an embodiment of a network, similar to the network described with reference to FIG. 3, which includes redundant routers that connect clients A and B to the servers W, X, Y, and Z where one of the redundant routers is in active mode and the other redundant router is in standby as is known in the prior art.

In order to provide protection against equipment failures, redundancy is often built into the networks. For example, a network may be built with a primary router that handles all of the traffic under normal conditions and a secondary router that waits in the background to handle traffic in the event of a failure of the primary router. FIG. 5 depicts an embodiment of a network, similar to the network described with reference to FIG. 3, which includes redundant routers 422 and 424 that connect clients A and B 410 and 412 to the servers W, X, Y and Z 430, 432, 434, and 436. In the example of FIG. 5, router A is the primary router and router B is the secondary router. The primary router is the active router that handles all of the traffic between the clients and the servers. As depicted in FIG. 5, while router A is active, the sessions, including sessions A and B, are run through router A. In addition, router A establishes all of the sessions between the clients and servers and maintains the set of session bindings. The secondary router is in standby mode and does not process incoming traffic. In addition, while in standby mode, the secondary router does not establish sessions or generate session bindings. In the embodiment of FIG. 5, both routers use the same VIP (i.e., VIP=$IP_3$).

Figure 6:
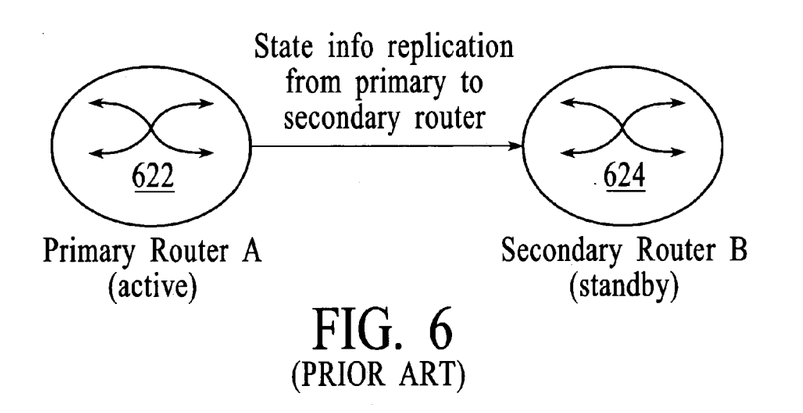
FIG. 6 depicts the replication of the state information from a primary (active) router to a secondary (standby) router as is known in the prior art.

In the event of a failure of the primary router A, the traffic is switched over to the secondary router B. To achieve a "stateful failover" in the event of a failure of the primary router, the secondary router should have all of the same state information (i.e., the same session binding) as the primary router. A conventional technique that is used to achieve stateful failover between the primary and secondary routers involves periodically replicating the state information from the primary (active) router to the secondary (standby) router. That is, the state information at the primary router is periodically copied from the primary router to the secondary router. FIG. 6 depicts the replication of the state information from the primary (active) router 622 to the secondary (standby) router 624. Typically, replication is performed through a direct connection between the primary and secondary routers.

Figure 7:
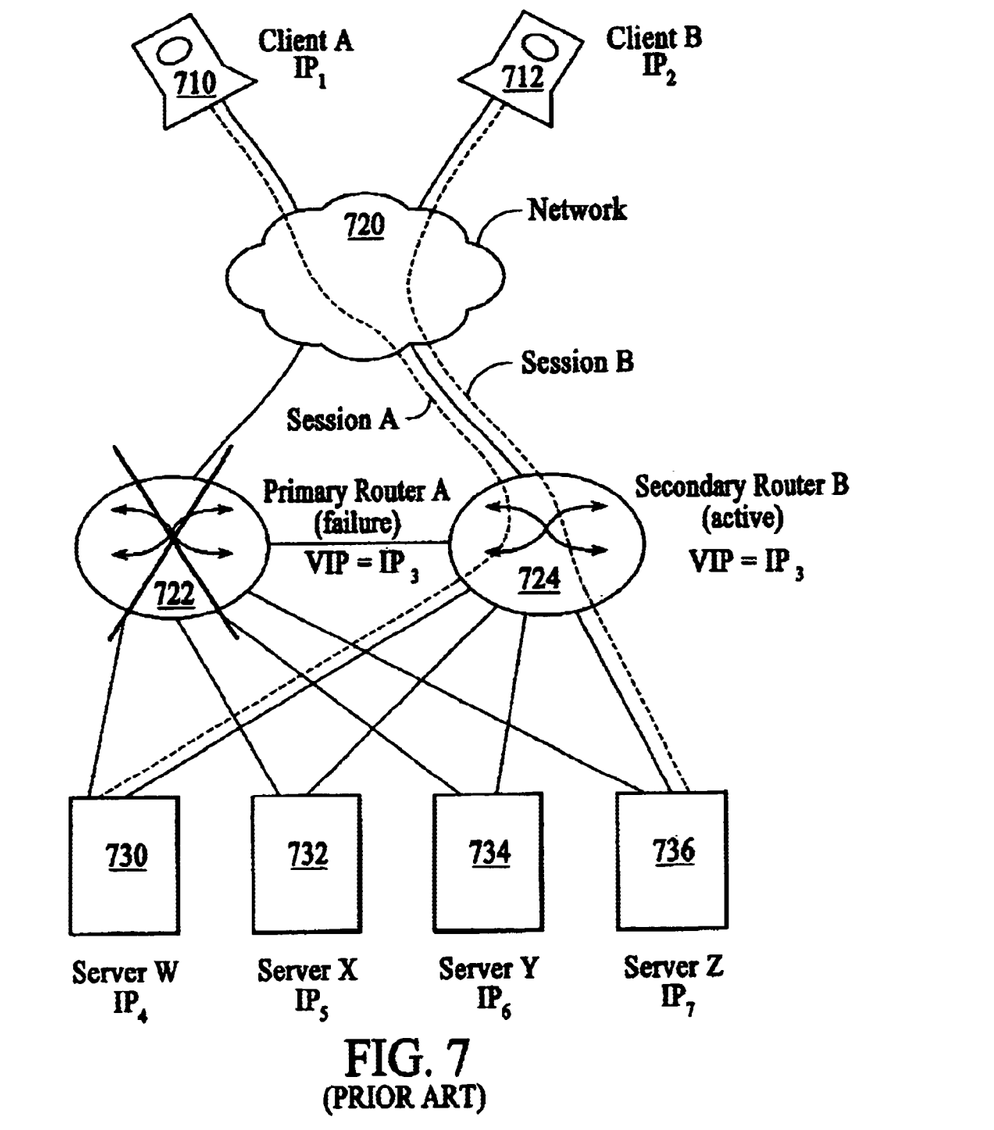
FIG. 7 depicts the network of FIG. 5 after a switchover from the primary to the secondary router has occurred in response to a failure of the primary router as is known in the prior art.

FIG. 7 depicts the network of FIG. 5 after a switchover from the primary router A 722 to the secondary router B 724 has occurred. As depicted in FIG. 7, sessions A and B are now supported by the secondary router B, which is now the active router. To achieve a stateful failover, the active session bindings that were being utilized by router A must be present in router B. If a stateful failover is achieved, the active sessions that were being supported by router A do not have to be re-established by router B.

Although redundant routers work well to provide failure protection and although the replication of sessions bindings from an active router to a standby router can achieve "stateful failover," the use of redundant routers as described above with reference to FIGS. 5–7 is resource intensive and increases the cost of the network. Specifically, the secondary router, waiting in standby mode, does not increase the volume of traffic that can be handled between clients and servers, however, it requires the purchase and maintenance of two routers instead of only a single router. Being able to handle more traffic and/or increasing the rate at which traffic is processed can increase the value of a network.

In view of the inefficiencies of current failover protection techniques, what is needed is a failover protection technique that provides stateful failover and that makes efficient use of network resources.

SUMMARY OF THE INVENTION

A technique for providing failure protection between two routers that are actively providing load sharing using network address translation involves generating state information at the two routers and then exchanging the state information between the two routers so that each router has a combined set of state information that can be used in the event of a failure of the other router. Because both of the routers are actively providing load sharing network address translation until a time when one of the routers fails, the resources of a secondary router waiting in standby mode are not wasted.

An embodiment of a method for providing stateful failover protection between first and second routers, wherein the first and second routers provide load sharing among multiple network nodes using network address translation, involves generating state information at the first router, generating state information at the second router, and exchanging state information between the first and second routers.

Another embodiment of the method involves forming a combined set of state information at the first router using the state information that is generated at the first router and the state information that is generated at the second router and forming a combined set of state information at the second router using the state information that is generated at the second router and the state information that is generated at the first router.

Another embodiment of the method involves utilizing the exchanged state information at the first router to provide load sharing utilizing network address translation in the event of a failure of the second router or utilizing the exchanged state information at the second router to provide load sharing utilizing network address translation in the event of a failure of the first router.

Another embodiment of the method involves exchanging the state information between the first and second routers while both of the routers are active.

Another embodiment of the method involves exchanging the state information between the first and second routers while both of the routers are supporting active communications sessions between clients and the network nodes.

Another embodiment of the method involves providing the state information at the second router to the first router in order to form a combined set of state information at the first router and providing the state information at the first router to the second router in order to form a combined set of state information at the second router. A further embodiment involves utilizing the combined set of state information at the first router to provide load sharing utilizing network address translation in the event of a failure of the second router or utilizing the combined set of state information at the second router to provide load sharing utilizing network address translation in the event of a failure of the first router.

In another embodiment of the method, the generation of state information involves establishing session bindings. In a further embodiment, each of the session bindings includes a client source IP address, a client source port number, a virtual destination IP address, a virtual destination port number, a real destination IP address, and a real destination port number.

In another embodiment of the method, the exchanging of state information includes forwarding the state information through an intermediate network node.

Another embodiment of a method for providing stateful failover protection between first and second routers, wherein the first and second routers provide load sharing among multiple servers using network address translation, involves generating a first session binding at the first router, generating a second session binding at the second router, and exchanging the first and second session bindings between the first and second routers.

An embodiment of a system for providing stateful failover protection between first and second routers, wherein the first and second routers provide load sharing among multiple servers using network address translation, includes session binding logic configured to generate a first session binding at the first router and exchange logic configured to provide the first session binding to the second router and to receive a second session binding from the second router.

An embodiment of another system for providing stateful failover protection between first and second routers, wherein the first and second routers provide load sharing among multiple servers using network address translation, includes first and second routers. The first and second routers each include session binding logic configured to generate router-specific session bindings and exchange logic configured to exchange the router-specific session bindings between the first and second routers.

Other aspects and advantages of the present invention will become apparent from the following detailed description,

DETAILED DESCRIPTION

A technique for providing failure protection between two routers that are actively providing load sharing using network address translation involves generating state information at the two routers and then exchanging the state information between the two routers so that each router has a combined set of state information that can be used in the event of a failure of the other router.

Figure 8:
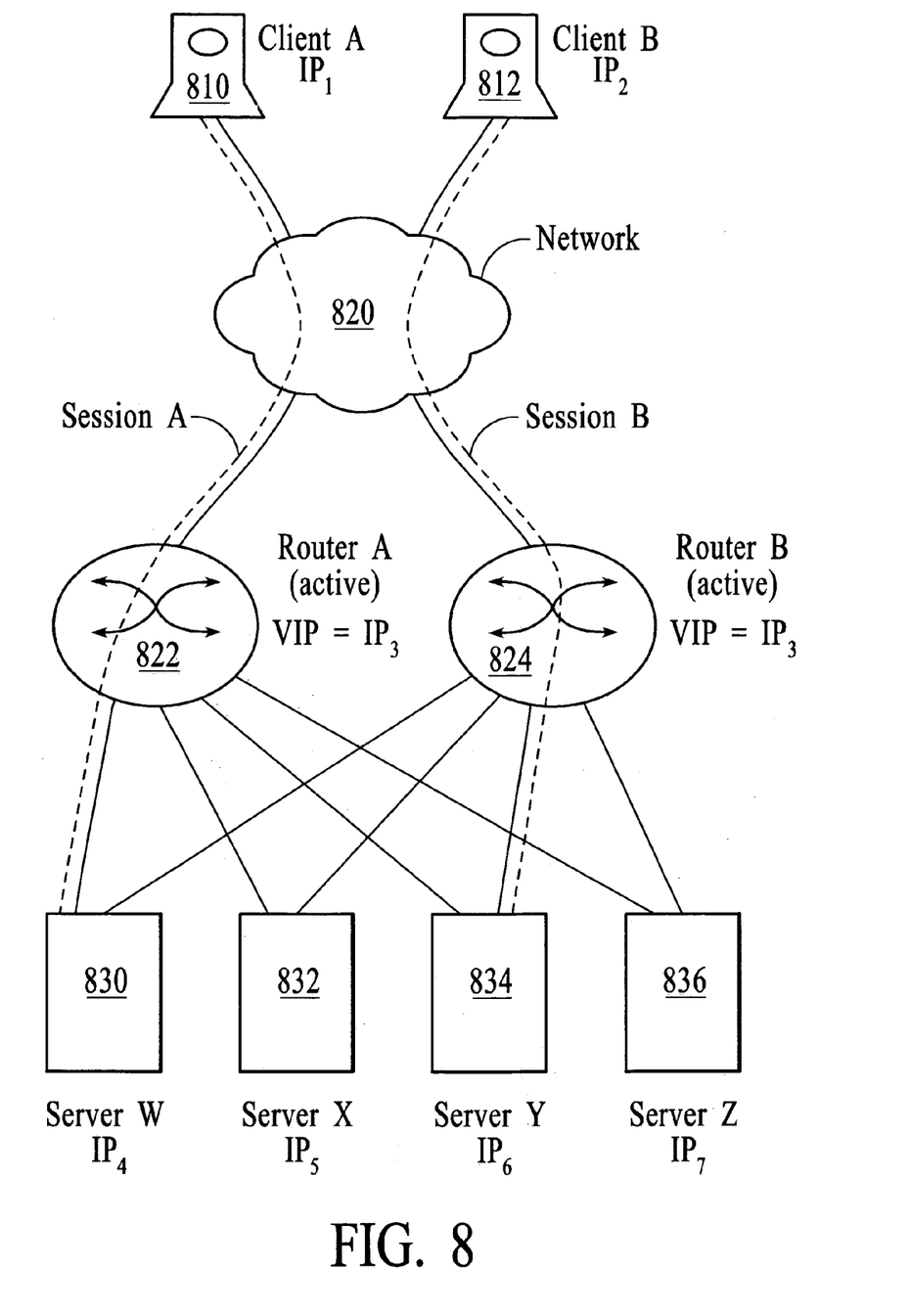
FIG. 8 depicts an embodiment of a network that includes multiple clients, an intermediate network, two routers, and multiple servers where both of the two routers are actively supporting communications sessions between the clients and the servers in accordance with an embodiment of the invention.

FIG. 8 depicts an embodiment of a network that includes multiple clients 810 and 812, an intermediate network 820 (i.e., unspecified network, often referred to as a "network cloud"), two routers 822 and 824, and multiple servers 830, 832, 834, and 836. The routers are each individually connected to each of the servers (i.e., servers W, X, &, and Z) and either of the routers can connect any of the clients to any of the servers. In the embodiment of FIG. 8, both of the routers are active at the same time. In an embodiment, the routers provide load sharing using IP network address translation (LSNAT) as described in RFC 2391, which is incorporated by reference herein. That is, the routers simultaneously and independently support active communications sessions between the clients and the servers, establish new sessions between the clients and the servers, and generate and maintain router-specific session bindings. As long as both routers are active, they can each support active communications sessions at their maximum capacity. Because each of the routers can connect any of the clients to any of the servers, either one of the routers can provide failover protection in the event of the failure of the other router. Throughout the description, similar reference numbers may be used to identify similar elements.

In accordance with an embodiment of the invention, to achieve a "stateful failover" in the event of a failure of either of the active routers, the state information (i.e., session bindings) generated at each active router is exchanged between the two routers so that each router has a combined set of state information. For example, during operation, router A generates and maintains a set of session bindings that includes session binding A and router B generates and maintains a set of session bindings that includes session binding B. The session bindings within the two sets are periodically exchanged between the two routers so that each router has a combined set of session bindings that includes the combination of the sessions bindings from each router.

Figure 9:
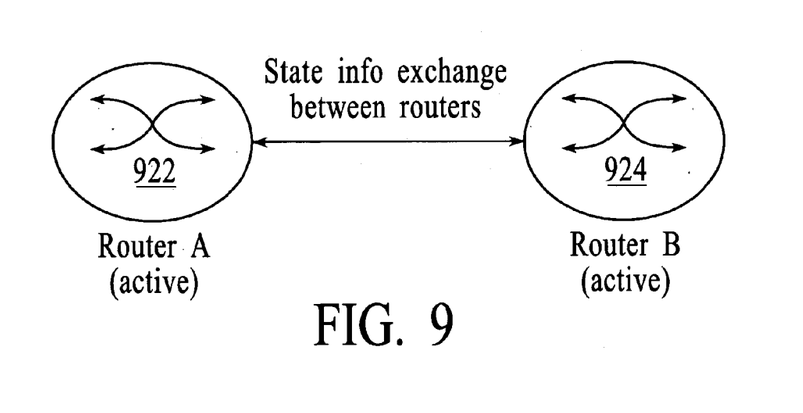
FIG. 9 depicts the exchange of state information between the two active routers in accordance with an embodiment of the invention.

FIG. 9 depicts the exchange of state information between two active routers 922 and 924. In the embodiment of FIG. 9, the exchange of state information involves router A providing state information to router B and router B providing state information to router A. For example, router A provides its router-specific session bindings to router B and router B provides its router-specific session bindings to router A. The two routers use the exchanged state information to form complete sets of state information at each router. The technique of bidirectionally exchanging session binding information between routers is in contrast to the technique of unidirectionally replicating session binding information from a primary router 622 that is in active mode to a secondary router 624 that is in standby mode as described with reference to FIG. 6. In an embodiment, the exchange of state information involves the exchange of newly generated state information. For example, a new session binding is provided to the other router each time a new session binding is generated at a router.

Figure 10:
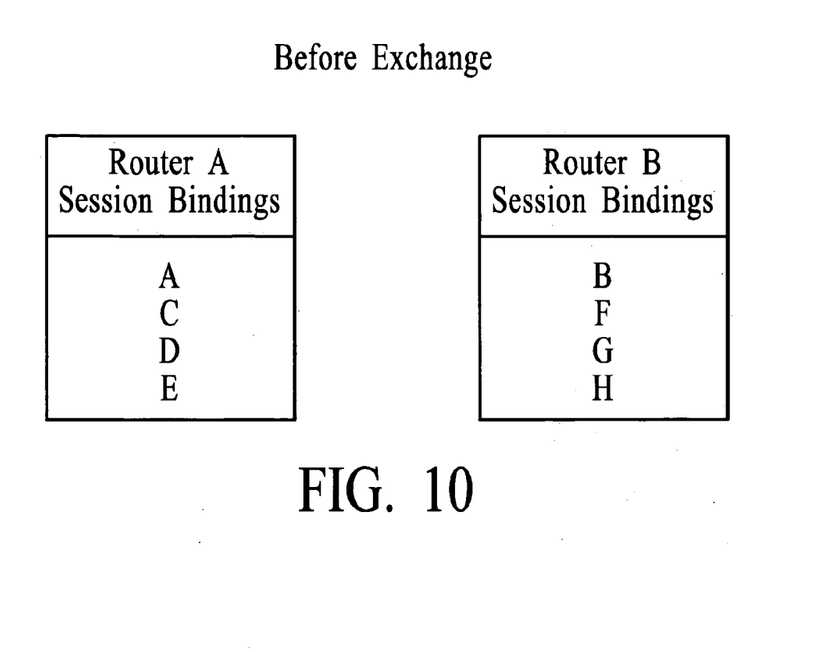
FIG. 10 depicts two example sets of session bindings that are unique to routers A and B.

FIG. 10 depicts two example sets of session bindings that are unique to routers A and B. In the example, the router-specific sets of session bindings are generated at the respective routers using the techniques described in RFC 2391 and reflect sessions that are established at the respective routers. In the example of FIG. 10, the set of session bindings that is generated at router A includes session bindings A, C, D, and E and the set of session bindings that is generated at router B includes session bindings B, F, G, and H. In an embodiment, a set of session bindings may contain a single session binding. Before an exchange of state information takes place, router A has no knowledge of the session bindings at router B and router B has no knowledge of the session bindings at router A. In an embodiment, each session binding includes a client IP address, a client port number, a virtual IP (VIP) address, a virtual port number, a real IP address, and a real port number, where the VIP address and port number relate to the routers A and B and where the real IP addresses and port numbers relate to the servers W, X, Y, and Z. Although the session bindings are described herein as including specific information, the session bindings may include other variations of information. For example, the session bindings may include only address information. In addition, the session bindings may include layer 2 information and/or router physical port information.

In accordance with an embodiment of the invention, the two sets of session bindings are exchanged between the routers such that each router can form a combined set of session bindings that can be used in the event of a failover of either one of the routers. Specifically, router A provides router B with the set of session bindings that includes A, C, D, and E and router B provides router A with the set of session bindings that includes B, F, G, and H. Each router uses the received set of session bindings to form its own combined set of session bindings. In an embodiment, the sets of session bindings that are exchanged include only newly generated session bindings. That is, the sets of session bindings that are exchanged do not include every active session binding at the router, only the newly generated session bindings. In addition, in an embodiment, session bindings are passed from the generated router to the receiving router immediately upon generate of each new session binding.

Figure 11:
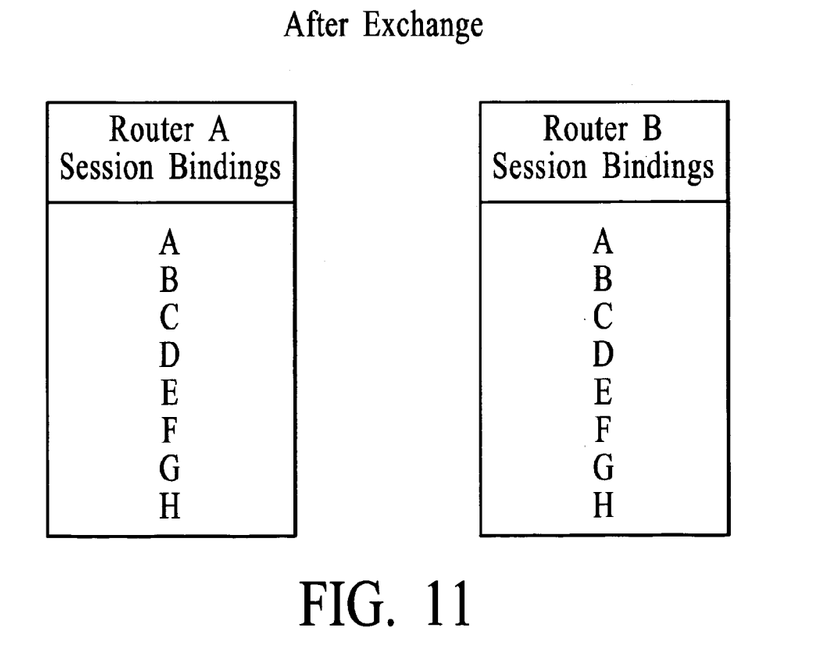
FIG. 11 depicts the set of session bindings at each router after the exchange of session bindings is complete in accordance with an embodiment of the invention.

FIG. 11 depicts the set of session bindings at each router after the exchange of session bindings is complete. As depicted in FIG. 11, each router now maintains a combined set (i.e., A, B, C, D, E, F, G, and H) of session bindings. Because both routers have combined sets of session bindings after the exchange, if either one of the routers fails, the other routers can seamlessly support all of the active sessions between the clients and the servers. That is, either one of the routers can provide LSNAT without having to generate new state information to maintain the sessions that were being supported by the now failed router.

The process of establishing router-specific sessions, generating router-specific session bindings, and then exchanging the session binding information between the router is a continuous process. In an embodiment, the exchange process is automatically triggered each time a new session is generated at either one of the routers. For example, router A sends session information to router B upon the generation of a new session binding.

Figure 12:
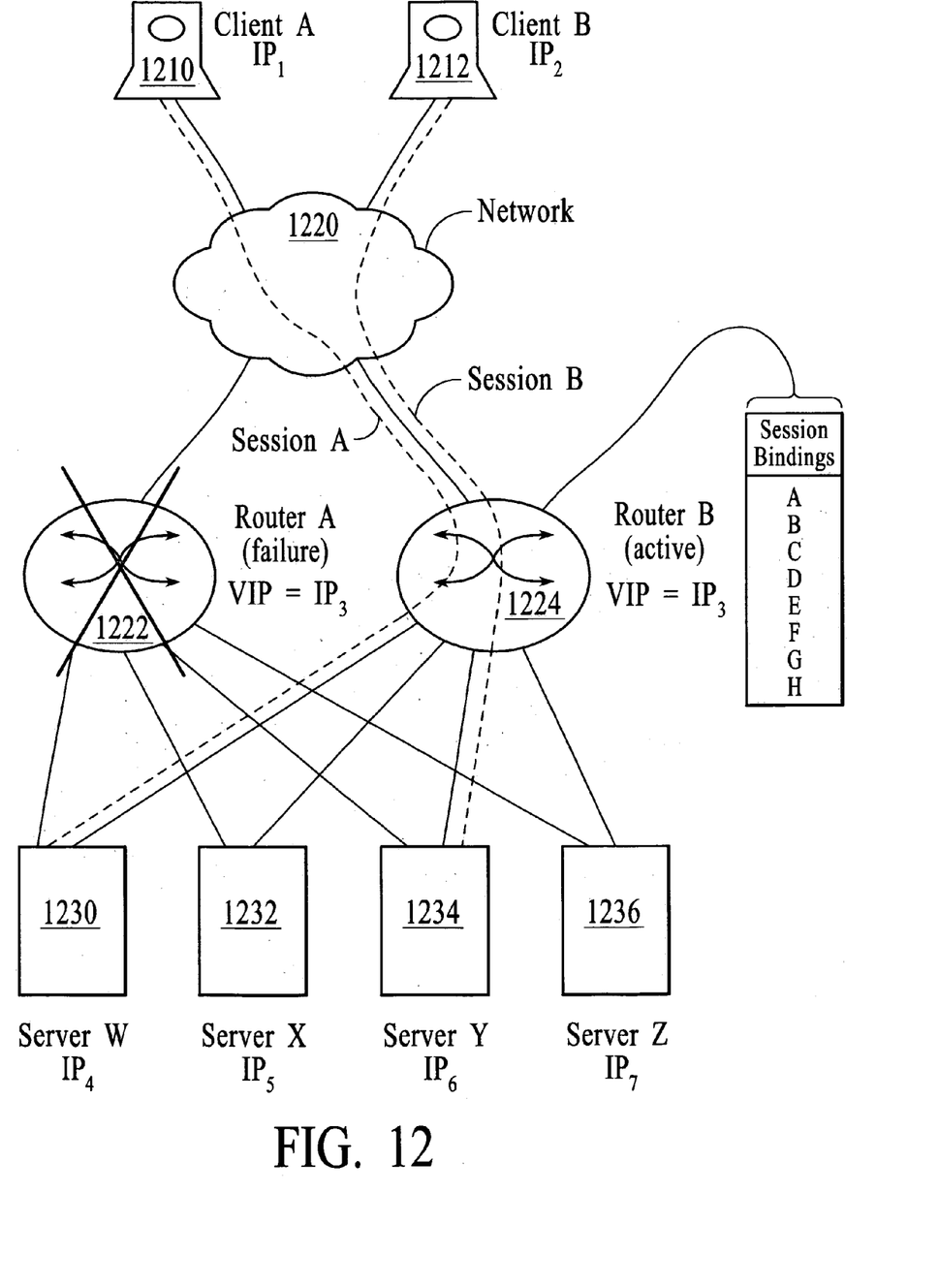
FIG. 12 depicts the network of FIG. 8 in the event of a failure of router A where router B seamlessly supports the active communications sessions that were being supported by router A in accordance with an embodiment of the invention.

FIG. 12 depicts the network of FIG. 8 in the event of a failure of router A. As depicted in FIG. 12, both sessions A and B are supported by router B 1224 in the event of a failure of router A 1222. In accordance with an embodiment of the invention, a "stateful failover" is achieved in which router B is able to seamlessly support session A without having to re-establish the session and re-generate the session binding. That is, a stateful failover is achieved when session binding information does not have to be re-generated in the remaining active router in order to support the session that were being supported by the failed router. As depicted in FIG. 12, router B is able to seamlessly support session A because router B has a combined set of the session bindings that was generated by the exchanging of session bindings between the two routers, including the session binding for session A. Because session A is seamlessly preserved, client A does not see a disruption of service if server A fails. The combined set of session bindings that is maintained by router B after the exchange of state information between routers A and B is depicted in FIG. 12 and is the same set as described with reference to FIG. 11.

In an embodiment, both routers advertise the same VIP (i.e., VIP=$IP_3$) to an upstream router. If one of the routers (A or B) fails and stops sending advertisements to the upstream router, then the router begins to direct all IP packets destined for the VIP to the router that is still active.

In an embodiment, router A goes from a failure state back to an active state. Once router A is in an active state, router B can provide router A with its state information (i.e., session bindings). Providing router A with the state information from router B prevents router A from having to generate new session bindings on its own. In another embodiment, an active router can provide state information to any newly identified router (i.e., a peer router) upon discovery of the router.

In an embodiment, state information is exchanged between the two routers so that each router can form a combined set of state information. In an embodiment, each combined set of session bindings represents a complete set of session bindings. That is, all of the generated session bindings for the two routers are included in both of the combined sets. A combined set of session bindings may be equivalent to a complete set of session bindings immediately following the exchange of state information. However, if enough time passes between state information exchanges, differences between the two sets of session bindings may begin to develop as each router established new sessions and generates new session bindings. Upon the next exchange of session bindings, the combined sets of session bindings are again equivalent to a complete set of session bindings. In an embodiment, new session bindings are exchanged between routers as soon as the new session bindings are created.

In an embodiment, state information is exchanged between the routers through a direct connection. That is, if the two routers are directly connected by a transmission media, such as an optical fiber or a copper wire, the state information can be exchanged directly between the two routers. In an embodiment that involves exchanging state information through a direct connection, the two routers must be located physically close to each other because of the distance limitations of direct connections.

Figure 13:
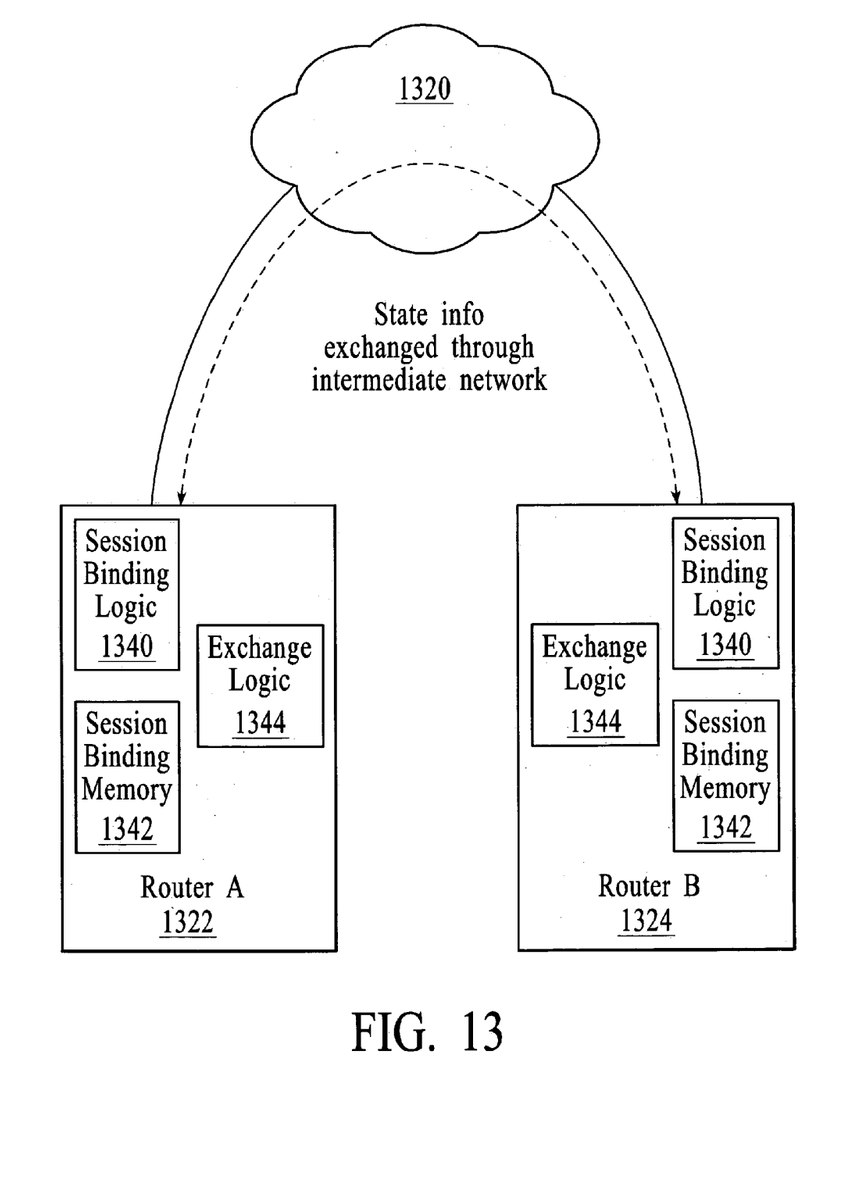
FIG. 13 depicts an embodiment of functional elements within the routers that enable stateful failover and the exchange of state information between two routers via an unspecified network that includes at least one intermediate network node that is located between the two network nodes in accordance with an embodiment of the invention.

In another embodiment, state information is exchanged between the routers through an intermediate network. For example, state information is exchanged by communicating over a private network such as an intranet or over the Internet. FIG. 13 depicts the exchange of state information between two routers 1322 and 1324 via an intermediate network 1320 that includes at least one intermediate network node. When state information is exchanged through an intermediate network, the routers can be located physically distant from each other. In an embodiment, the state information is exchanged using a packet-based protocols such as TCP and IP.

FIG. 13 also depicts an embodiment of functional elements within the routers that enable stateful failover as described above with reference to FIGS. 8–12. The functional elements within each router include session binding logic 1340, session binding memory 1342, and exchange logic 1344. The session binding logic supports active communications sessions between the clients and servers and establishes new sessions between the clients and the servers. In an embodiment, the session binding logic implements LSNAT as described in RFC 2391. The session binding memory is memory that stores the session bindings that are established at the respective routers. The exchange logic manages the exchange of state information (i.e., session bindings) between the routers as described with reference to FIGS. 8–12 and FIGS. 14–15.

Figure 14:
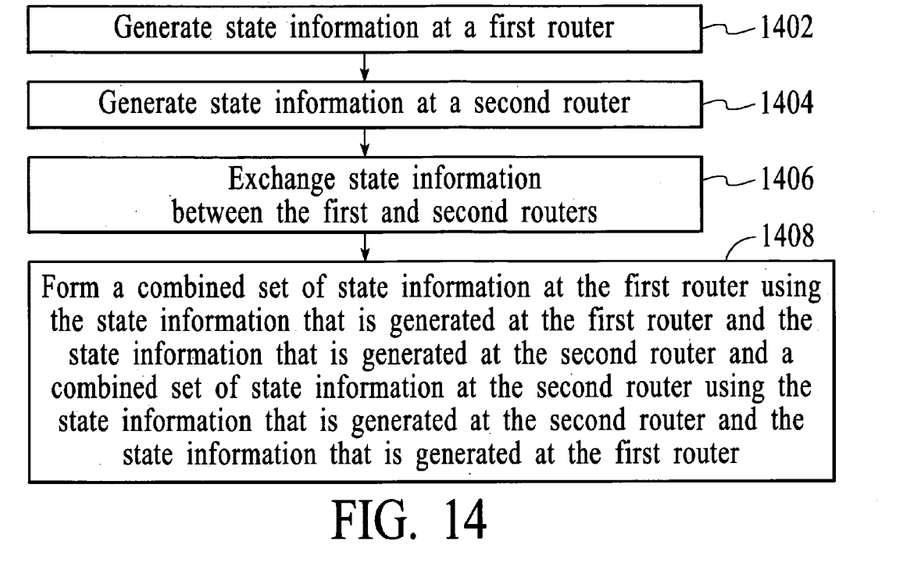
FIG. 14 depicts a process flow diagram of a method for providing failure protection between first and second routers in accordance with an embodiment of the invention.

FIG. 14 depicts a process flow diagram of a method for providing stateful failover protection between first and second routers, wherein the first and second routers provide load sharing among multiple network nodes using network address translation. At block 1402, state information is generated at a first router. At block 1404, state information is generated at a second router. At block 1406, state information is exchanged between the first and second routers. In a further embodiment, at block 1408, a combined set of state information is formed at the first router using the state information that is generated at the first router and the state information that is generated at the second router and a combined set of state information is formed at the second router using the state information that is generated at the second router and the state information that is generated at the first router.

Figure 15:
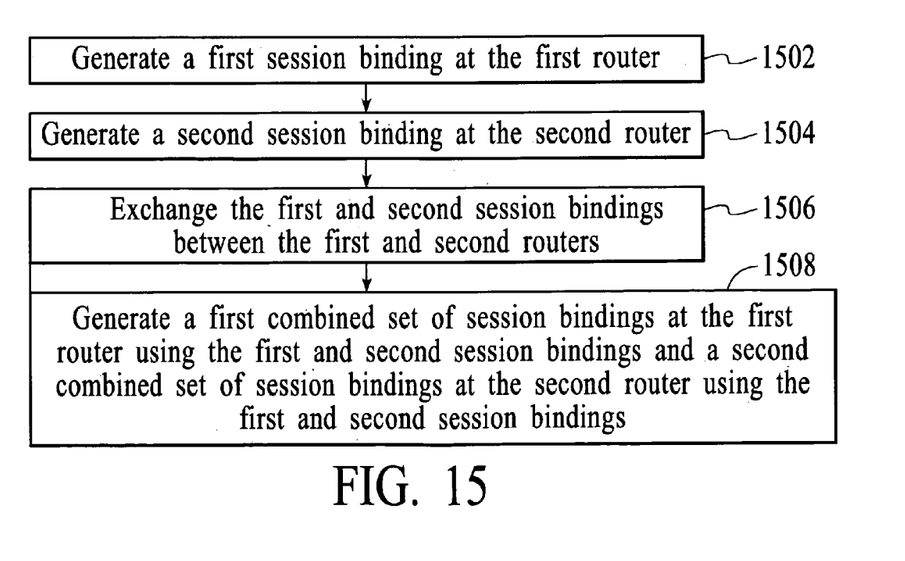
FIG. 15 depicts a process flow diagram of a method for providing failure protection between first and second routers in accordance with an embodiment of the invention.

FIG. 15 depicts a process flow diagram of a method for providing stateful failover protection between first and second routers, wherein the first and second routers provide load sharing among multiple network nodes using network address translation. At block 1502, a first session binding is generated at the first router. At block 1504, a second session binding is generated at the second router. At block 1506, the first and second session bindings are exchanged between the first and second routers. In a further embodiment, at block 1508, a first combined set of session bindings is generated at the first router using the first and second session bindings and a second combined set of session bindings is generated at the second router using the first and second session bindings. In an embodiment, the exchange of session bindings involves the exchange of only newly generated session bindings.

Although RFC 2391 describes LSNAT in terms of IP, it should be understood that load sharing utilizing network address translation could be applied to other network protocols, for example, IPX.

Although clients and servers are described as the network devices that constitute both ends of the communications sessions, other network devices or network nodes may constitute one or both ends of the communications sessions that are supported by the routers.

Although only two sessions are described with reference to FIGS. 8 and 12, it should be understood that either one of the routers is capable of managing thousands of sessions at any one time.

A method in accordance with the present invention may also be implemented, for example, by operating a computer system to execute a sequence o machine-readable instructions. The instructions may reside in various types of computer readable media. In this respect, another embodiment of the invention involves a programmed product, comprising computer readable media tangibly embodying a program of machine readable instructions executable by a digital data processor to perform a method for discarding routes from a router.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of complied C, C++, or similar language code commonly used by those skilled in the programming for this type of application arts.

Although specific embodiments of the invention have been described and illustrated, the invention is not to be limited to the specific forms or arrangements of parts as described and illustrated herein. The invention is limited only by the claims.

What is claimed is:

1. A method for providing stateful failover protection between first and second routers, wherein said first and second routers provide load sharing among multiple servers in a server farm using network address translation, said method comprising:

establishing, at the first router, session bindings between clients and the servers in the server farm;

establishing, at the second router, session bindings between clients and servers in a server farm;

at the first router, performing load sharing using Internet Protocol (IP) network address translation (LSNAT) between the clients and the servers in the server farm;

at the second router, performing LSNAT between the clients and the servers in the server farm;

exchanging session bindings between the first and second routers; and utilizing the exchanged session bindings at the first router to continue to perform LSNAT for session bindings that were established by the second router in the event of a failure of said second router; or utilizing the exchanged session bindings at the second router to continue to perform LSNAT for session bindings that were established by the first router in the event of a failure of said first router.

2. The method of claim 1 further including:

forming a combined set of session bindings at said first router using said session bindings that were generated at said first router and said session bindings that were generated at said second router; and forming a combined set of session bindings at said second router using said session bindings that were generated at said second router and said session bindings that were generated at said first router.

3. The method of claim 1 wherein said session binding are exchanged between said first and second routers while both of said routers are supporting active communications sessions between clients and said servers in the server.

4. The method of claim 1 wherein each of said session bindings includes a client source IP address, a client source port number, a virtual destination IP address, a virtual destination port number, a real destination IP address, and a real destination port number.

5. The method of claim 1 wherein said exchanging session bindings includes forwarding said session bindings through an intermediate network node.

6. The method of claim 1 wherein LSNAT is performed according to the Internet Engineering Task Force (IETF) document Request for Comments (RFC) 2391.

7. A method for providing stateful failover protection between first and second routers, wherein said first and second routers provide load sharing among multiple servers in a server farm using network address translation, said method comprising:
- establishing, at the first router, session bindings between clients and servers in a server farm, wherein a session binding includes a client source IP address, a client source port number, a virtual destination IP address, a virtual destination port number, a real destination IP address, and a real destination port number;
- establishing, at the second router, session bindings between clients and the servers in the server farm, wherein a session binding includes a client source IP address, a client source port number, a virtual destination IP address, a virtual destination port number, a real destination IP address, and a real destination port number;
- at the first router, performing load sharing using Internet Protocol (IP) network address translation (LSNAT) between the clients and the servers in the server farm;
- at the second router, performing LSNAT between the clients and the servers in the server farm;
- exchanging session bindings between the first and second routers; and
- utilizing the exchanged session bindings at the first router to continue to perform LSNAT for session bindings that were established by the second router in the event of a failure of said second router; or
- utilizing the exchanged session bindings at the second router to continue to perform LSNAT for session bindings that were established by the first router in the event of a failure of said first router.

8. The method of claim 7 further including:
- generating a first combined set of session bindings at said first router using said first and second session bindings; and
- generating a second combined set of session bindings at said second router using said first and second session bindings.

9. The method of claim 7 wherein said first and second session bindings are exchanged while both routers are supporting active communications sessions between clients and said network nodes.

10. The method of claim 7 wherein exchanging said first and second session bindings includes forwarding said session bindings through an intermediate network node.

11. The method of claim 7 wherein LSNAT is performed according to the Internet Engineering Task Force (IETF) document Request for Comments (RFC) 2391.

12. A system for providing stateful failover protection between first and second routers, wherein said first and second routers perform load sharing using Internet Protocol (IP) network address translation (LSNAT) between clients and servers in a server, said system comprising:
- session binding logic configured to generate first session bindings at said first router and to implement LSNAT between clients and servers in a server farm;
- exchange logic configured to provide said first session bindings to said second router and to receive second session bindings from said secound router; and
- memory for storing said received second session bindings at said first router in order to perform LSNAT for the second session bindings in the event of a failure of said second router.

13. The system of claim 12 wherein said exchange logic is further configured to generate a first combined set of session bindings at said first router using said first and second session bindings.

14. The system of claim 12 wherein said session binding logic, said exchange logic, and said memory are located within said first router.

15. The system of claim 12 wherein LSNAT is performed according to the Internet Engineering Task Force (IETF) document Request for Comments (RFC) 2391.

16. The system of claim 12 wherein each of said session bindings includes a client source IP address, a client source port number, a virtual destination IP address, a virtual destination port number, a real destination IP address, and a real destination port number.

17. A system for providing stateful failover protection between first and second routers, wherein said first and second routers perform load sharing using Internet Protocol (IP) network address translation (LSNAT) between clients and servers in a server, said system comprising:
- first and second routers, said first and second routers each including:
- session binding logic configured to generate router-specific session bindings and to implement LSNAT between clients and servers in a server farm;
- exchange logic configured to exchange said router-specific session bindings between said first and said second routers; and
- memory for storing the exchanged router-specific session bindings in order to perform LSNAT for the router-specific session bindings that were generated at the other router in the event of a failure of the other router.

18. The system of claim 17 wherein said exchange logic at each router is configured to generate combined sets of session bindings using said first and second router-specific session bindings.

19. The system of claim 17 wherein said router-specific session bindings are exchanged while both routers are supporting active communications sessions between clients and said servers in the server.

20. The system of claim 17 wherein LSNAT is performed according to the Internet Engineering Task Force (IETF) document Request for Comments (RFC) 2391.

21. The system of claim 17 wherein each of said session bindings includes a client source IP address, a client source port number, a virtual destination IP address, a virtual destination port number, a real destination IP address, and a real destination port number.

* * * * *

UNITED STATES PATENT AND TRADEMARK OFFICE
CERTIFICATE OF CORRECTION

PATENT NO.         : 7,139,926 B1                                      Page 1 of 1
APPLICATION NO.    : 10/233002
DATED              : November 21, 2006
INVENTOR(S)        : Praveen Madhav et al.

It is certified that error appears in the above-identified patent and that said Letters Patent is hereby corrected as shown below:

In the Claims

In col. 11, line 58, claim 12 should read "and servers in a server farm" instead of "and servers in a server".
In col. 12, line 3, claim 12 should read "second" instead of "secound".

Signed and Sealed this
Twenty-fourth Day of June, 2014

Michelle K. Lee
*Deputy Director of the United States Patent and Trademark Office*